United States Patent [19]

Yamamoto et al.

[11] Patent Number: 4,754,399
[45] Date of Patent: Jun. 28, 1988

[54] DATA TRANSFER CONTROL SYSTEM FOR CONTROLLING DATA TRANSFER BETWEEN A BUFFER MEMORY AND INPUT/OUTPUT DEVICES

[75] Inventors: Akira Yamamoto, Yokohama; Toru Nishigaki, Sagamihara; Miho Nonomura, Yokohama; Takashi Doi, Hadano, all of Japan

[73] Assignee: Hitachi, Ltd., Tokyo, Japan

[21] Appl. No.: 687,163

[22] Filed: Dec. 28, 1984

[30] Foreign Application Priority Data

Dec. 28, 1983 [JP] Japan .................................. 58-250363
Aug. 22, 1984 [JP] Japan .................................. 59-173255

[51] Int. Cl.⁴ ........................ G06F 13/00; G11C 7/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,410,942 | 10/1983 | Milligan et al. | 364/200 |
| 4,500,965 | 2/1985 | Gray | 364/900 |
| 4,509,140 | 4/1985 | Cheung | 364/900 |
| 4,538,226 | 8/1985 | Hori | 364/200 |
| 4,542,458 | 9/1985 | Kitajima et al. | 364/200 |
| 4,598,363 | 7/1986 | Clark et al. | 364/200 |
| 4,602,331 | 7/1986 | Sheth | 364/200 |
| 4,604,709 | 8/1986 | Blount et al. | 364/900 |

Primary Examiner—Gary V. Harkcom
Assistant Examiner—Lawrence E. Anderson
Attorney, Agent, or Firm—Antonelli, Terry & Wands

[57] ABSTRACT

An input/output control system has a control unit including a first controller connected between a channel and a data buffer for controlling the transfer of data therebetween and a second controller connected between the data buffer and a plurality of input/output devices for controlling the transfer of data therebetween. A start action of the input/output device is effected in an off-line mode from the control unit. The amount of data stored in the data buffer is checked each time the transfer of data occurs between the channel and the data buffer. In the case of a read processing, when the amount of data stored in the data buffer becomes less than a first predetermined value, data is transferred for preload from the input/output devices to the data buffer. In the case of a write processing, when the amount of data stored in the data buffer exceeds a second predetermined value, data is transferred for after-write from the data buffer to the input/output devices. Each of the first and second predetermined values is determined depending on the amount of input-/output devices which are in an active state at that time. When each of the active input/output devices is allocated with m ($\geq 2$) unit fields of the data buffer each of which has a capacity of K/(mn) where K is the whole capacity of the data buffer and n is the number of the active input/output devices, the first and second predetermined values may be K/(mn) respectively.

6 Claims, 11 Drawing Sheets

FIG. 5

MEMORY FOR BUFFER MANAGING DATA 16

| MT ID 50 |
| --- |
| MT STATE 51 |
| READ/WRITE STATE 52 |
| BUFFER ADDRESS 53 |
| BUFFER LENGTH 54 |
| PRELOAD/AFTER-WRITE FLAG 55 |
| PRELOAD/AFTER-WRITE COMPLETION FLAG 56 |
| WAIT FLAG 57 |
| TEMPORARY FLAG 58 |

FIG. 6

MEMORY FOR CONTROL DATA 17

| NUMBER OF ACTIVE MTs 60 |
| --- |
| EMPTY BUFFER CAPACITY (SPACE) 61 |
| EMPTY BUFFER POINTER 62 |

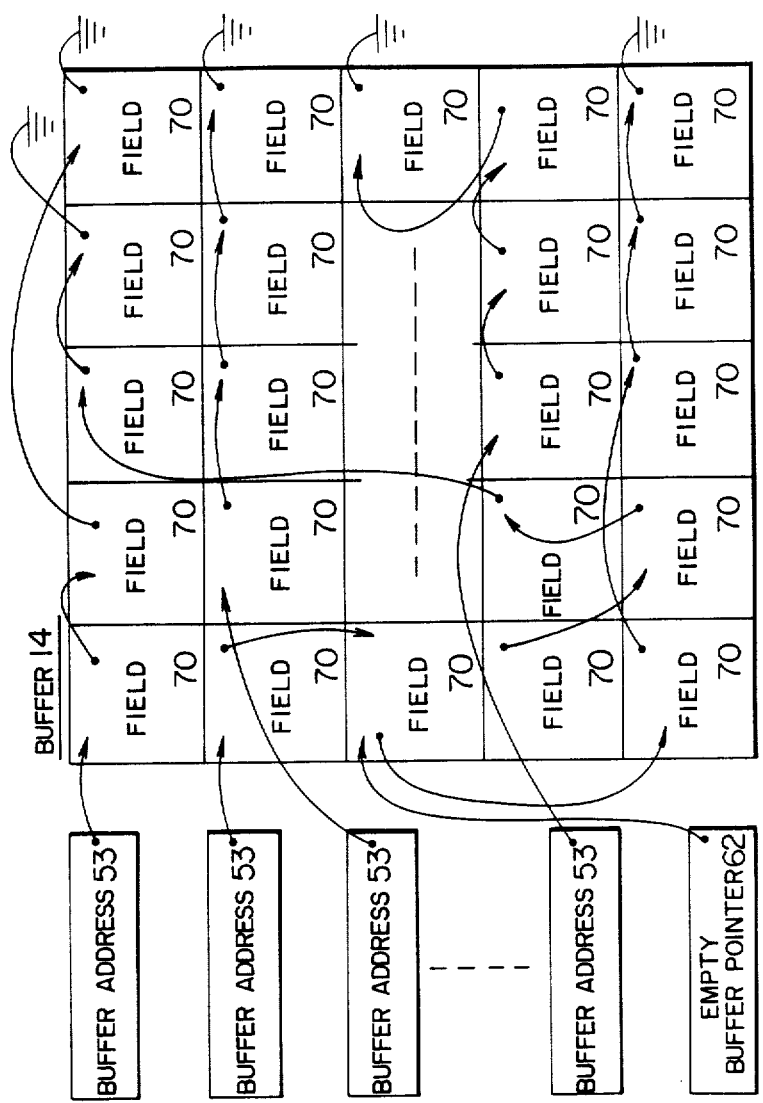

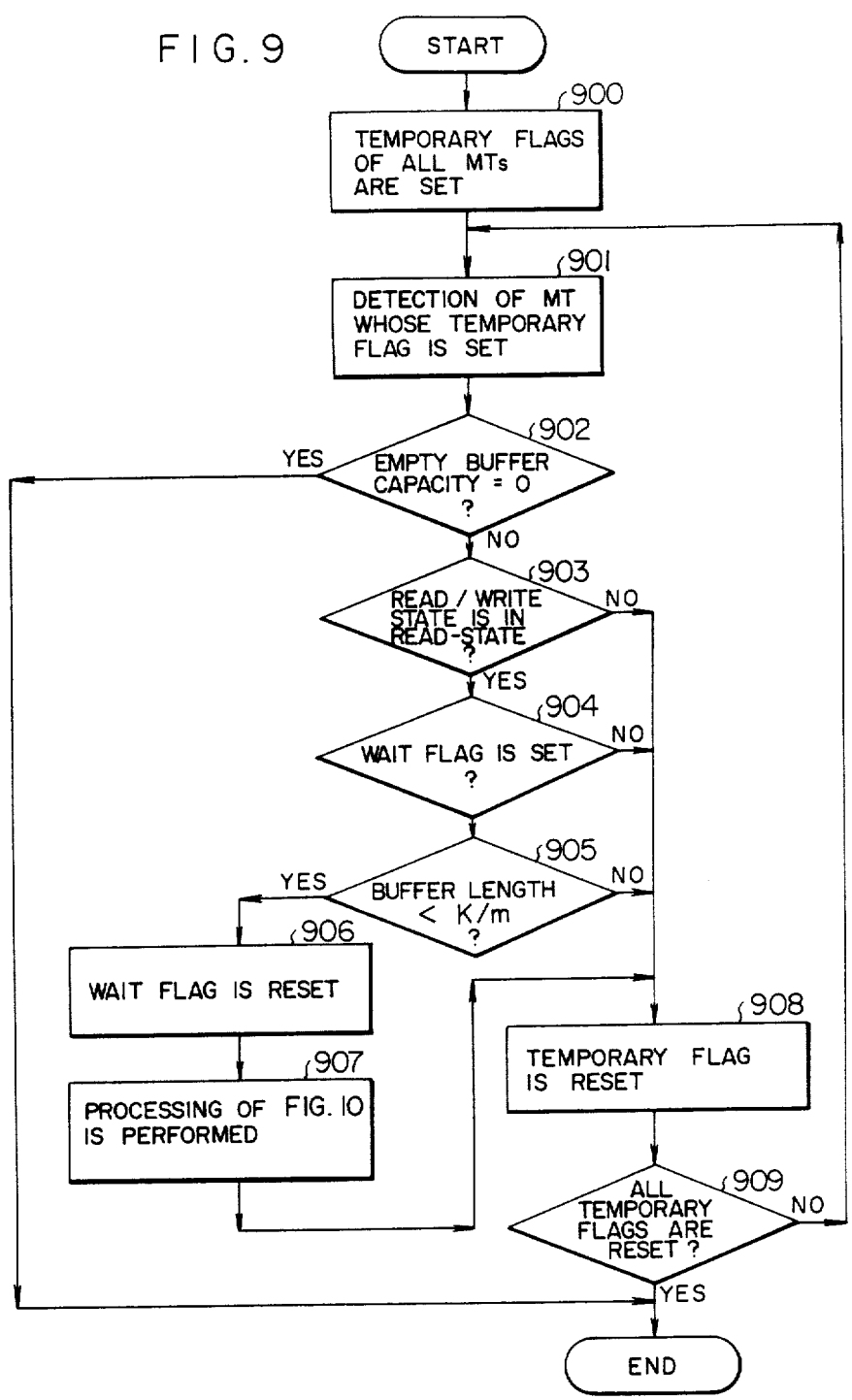

DATA TRANSFER CONTROL SYSTEM FOR CONTROLLING DATA TRANSFER BETWEEN A BUFFER MEMORY AND INPUT/OUTPUT DEVICES

BACKGROUND OF THE INVENTION

The present invention relates generally to an input/output control system and particularly to an input/output control system in which a buffer is provided for attaining cost reduction. In particular, the invention concerns an input/output control system for controlling magnetic tape devices, wherein each of the active magnetic tape devices (i.e. the devices mounted on tape decks) is allocated with at least two buffer areas or fields, to thereby allow the preload and/or after-write operation of data to be performed asynchronously with the input or output request from a main storage.

There has been proposed a control system in which a buffer is provided in an attempt to improve the cost-performance of an input/output system including magnetic tape devices.

The input/output control system for the magnetic tape devices in which the buffer is incorporated can be classified into two categories or types. According to one type, a control device having a buffer is connected to the hitherto known magnetic tape devices. In the other type of control system, the control device incorporating the buffer is connected to the magnetic tape devices from which vacuum column is removed. The first mentioned type control system is commercially available at present. The second mentioned type control system is disclosed in Japanese Patent Application Laid-Open Nos. 41955/1984, 43766/1984. Since the vacuum column is indispensable for a high-speed start action of the magnetic tape device, the time required for the start action of the magnetic tape device provided with no vacuum column is increased remarkably. Accordingly, the start action is performed on the off-line basis as in the case of the disc device. More specifically, in the case of the disc device, the off-line operation corresponds to the seek action and the search action. In contrast, in the case of the magnetic tape device, the off-line operation is performed for rewinding the tape to a position located immediately before the read-write position.

Further, there has also been proposed a control system in which a buffer is provided for permitting the preload and/or after-write operation of plural data blocks with a view to reducing the overhead corresponding to the time taken for the start operation of the magnetic tape devices.

In conjunction with suppression of the performance degradation brought about by the removal of the vacuum column to a minimum, there arises a problem with regard to the method of the preload and the after-write. More specifically, when the amount of data to be transferred for the preload and/or the after-write operation is insufficient, the frequency at which the start action is performed will be increased, involving degraded efficiency of utilization of the data transfer path.

SUMMARY OF THE INVENTION

It is an object of the present invention to provide an input/output control system in which the problems of the prior art systems described above are solved and which is capable of optimizing the amount of data for preload and/or after-write operation to the input/output devices in dependence on the variable number of the active input/output devices.

In view of the above object, there is provided according to an aspect of the invention, an input/output control apparatus connected to a plurality of input/output devices, comprising a data buffer, first control means for controlling data transfer between the data buffer and a main storage, and second control means for controlling data transfer between the data buffer and the input/output device, wherein the input/output devices perform start action offline (i.e. in the disconnected state) from the input/output control apparatus, further including means for changing the amount of data to be transferred for preload and/or afterwrite operation in dependence on the number of the input/output devices which are in the active state.

BRIEF DESCRIPTION OF THE DRAWINGS

FIG. 5 is a view showing a format of a MT buffer managing data unit used in the system shown in FIG. 1;

FIG. 6 is a view showing a format of a control information or data unit used in the system of FIG. 1;

FIG. 7 is a view showing a structure of a buffer used in the system of FIG. 1;

FIG. 9 is a view illustrating in a flow chart a sub-processing executed by the processor (a);

DESCRIPTION OF THE PREFERRED EMBODIMENTS

Figure 1:
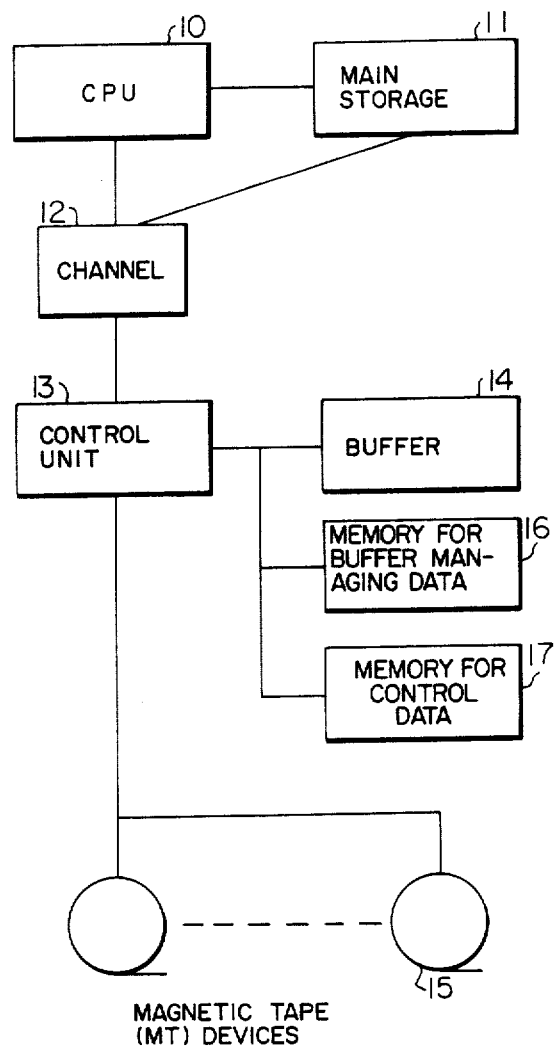
FIG. 1 is a block diagram showing a general arrangement of an input/output control system according to an embodiment of the present invention.

Now, the invention will be described in conjunction with exemplary embodiments thereof by referring to the drawings.

FIG. 1 shows in a block diagram a control system to which magnetic tape devices provided with no vacuum column area connected according to an embodiment of the invention.

Although the illustrated embodiment can be generally applied to the preload and after-write system for the input/output devices which perform the start action prior to the data transfer in an off-line mode from the control system, the following description will be made on the assumption that the input/output devices are constituted by magnetic tape devices (hereinafter also referred to as MT devices) provided with no vacuum column.

Referring to FIG. 1, a reference numeral 10 denotes a central processing unit or CPU, 11 denotes a main memory or storage, 12 denotes a channel, 13 denotes a control unit or controller, 14 denotes a buffer, 15 denotes a group of MT (magnetic tape) devices, 16 denotes, a buffer managing data unit, and 17 denotes a control information or data unit. In the illustrated system, the control unit 13 is so designed as to be capable of controlling simultaneously in parallel the data transfer between the main storage 11 and the buffer 14 on one hand and between the MT device 15 and the buffer 14 on the other hand. However, the control unit 13 is incapable of controlling simultaneously the data transfers to or from two or more MT devices 15.

Figure 2:
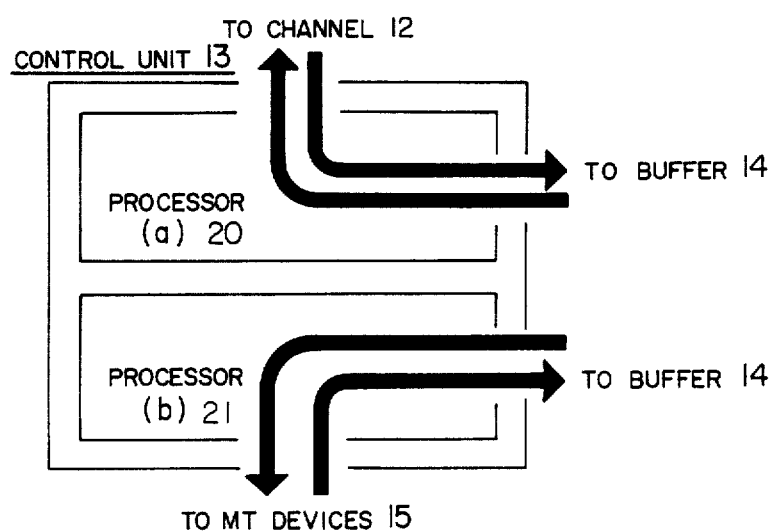
FIG. 2 is a view showing an arrangement of a control unit shown in FIG. 1.

FIG. 2 is a view showing a general arrangement of the control unit 13 shown in FIG. 1.

As will be seen, the control unit 13 includes a processor (a) 20 and a processor (b) 21 in a pair for processing simultaneously in parallel the data transfers between the channel 12 and the buffer 14 and between a given one of the MT devices 15 and the buffer 14. More specifically, the processor (a) 20 is allocated to the control of the data transfer between the channel 12 and the buffer 14 while the processor (b) 21 is allocated to the control of data transfer between the buffer 14 and the MT device 15.

Since each of the MT devices 15 is the one provided with no vacuum column and requires lots of time for the start action, the processing for the start action of the MT device is effected off-line (i.e. in the state disconnected) from the control unit 13. Consequently, connection of the processor (b) 21 of the control unit 13 with a desired one of the MT devices is allowed only after completion of the processing for the start action of that MT device. In this case, when another one of the MT devices is performing the data transfer with the buffer 14 by way of the processor (b) 21 at that time, the processing for the start action of the desired MT device is executed again. This processing is repeated until the processor (b) 21 is in the position to be connected with the desired MT device. (The reason why the data transfer with a given magnetic tape device can not take place immediately following the completed data transfer of one of the MT devices can be explained by the fact that the head of the MT device has to be positioned relative to the proper location of the magnetic tape on or from which data are written or read and that the tape must be transported at a constant speed, in order to allow the reading or writing of data from or to the MT device. Accordingly, when the chance for connection with the processor (b) of the control unit is missed, overrunning of the tape occurs, thus necessitating again the processing for the start action, i.e. restart action.)

In case the data transfer is to be effected between the processor (a) 20 and the processor (b) 21 by way of an interposed buffer such as the buffer 14, it is desirable to prepare the unit or block of data for transfer as small as possible and arrange both the processors in such a manner that data transfers can be effected asynchronously, with a view to realizing a higher degree of independency of the processors to thereby enhance the throughput of the whole system. For example, in the case of the inputting or writing operation, such a system is conceivable in which the preloading is effected immediately when an area in the buffer becomes empty. However, this arrangement is realizable only when the start action can be neglected. When the block on the basis of which data is transferred is small regardless of the start action for which a lot of processing time is required, it is difficult to attain a high efficiency of the processing because the time required for the start action occupies a larger part or proportion of the overall processing time.

Under these circumstances, it is necessary to prepare the data block to be transferred at optimum.

Here, the meanings of symbols used in the following description will be defined.

A symbol represents the number of the active MT devices (i.e. the number of MT devices mounted on tape decks), m represent the number of buffer areas (fields) assigned to each of the MT devices, z represents the time required for the start action, K represents the total buffer size or capacity, and t represents the time required for data transfer per unit capacity of the MT device (and thus Kt represents the time required for transferring the whole data of the buffer to the MT device).

Needless to say, the block of data for transfer is defined by K/(mn). Assuming that the data transfer time as well as the start time (i.e the time required for the start action) is of exponential distribution, the data transfer throughput $\alpha$ of the processor (b) 21 can be expressed as follows:

$$\alpha = mn/(Kt + mz) \qquad (1)$$
$$= (n/z) - (nKt/z)/(Kt + mz)$$

Since the throughput of the processor (b) 21 decreases monotonously as a function of m, as will be seen from the above expression (1), the throughput is more reduced as the number of the buffer areas (or fields) increases. Accordingly, on the condition that m=1, that is, the number of the buffer areas allocated to each of the MT devices is one, the maximum throughput can be obtained. However, when only one buffer area (field) is allocated to each of the MT devices, there arises a problem that the processing for the data transfer between the MT device and the buffer can not be executed in parallel with other processings (e.g. the processings executed by the CPU 10 and the processings for data transfers among the buffer 14, data processor (a) 20, channel 12 and main storage 11). This problem must be taken into consideration.

When the time taken for transferred data of all the buffer areas (field) in the buffer 14 to the main storage 11 through the data processor (a) 20 and the channel 12 or vice versa and processing the data by the CPU 10 is represented by T, the throughput $\beta$ of the whole system can be represented by the following expression:

$$\beta = [1 - \{1 - T(Kt+mz)\}/\{1 - T^{mm+1}/(Kt+mz)^{mn+1}\}] \qquad (2)$$

$$\lim \beta \to 0 \qquad (3)$$
$$m \to +0$$

$$\lim \beta \to 0 \qquad (4)$$
$$m \to +\infty$$

Since the expressions (3) and (4) obviously are valid and $\beta$ takes non-negative value, the throughput $\beta$ is naturally capable of assuming the optimal value in dependence on the value of m. The optimal solution can be obtained by differentating $\beta$ in terms of m. However, differentiation of the expression (2) in terms of m will involve much complicated equations, making it practically impossible to obtain the solution. Under the circumstances, the value of m which can maximize the value of $\beta$ is obtained by evaluating all the conceivable cases.

Figure 3:
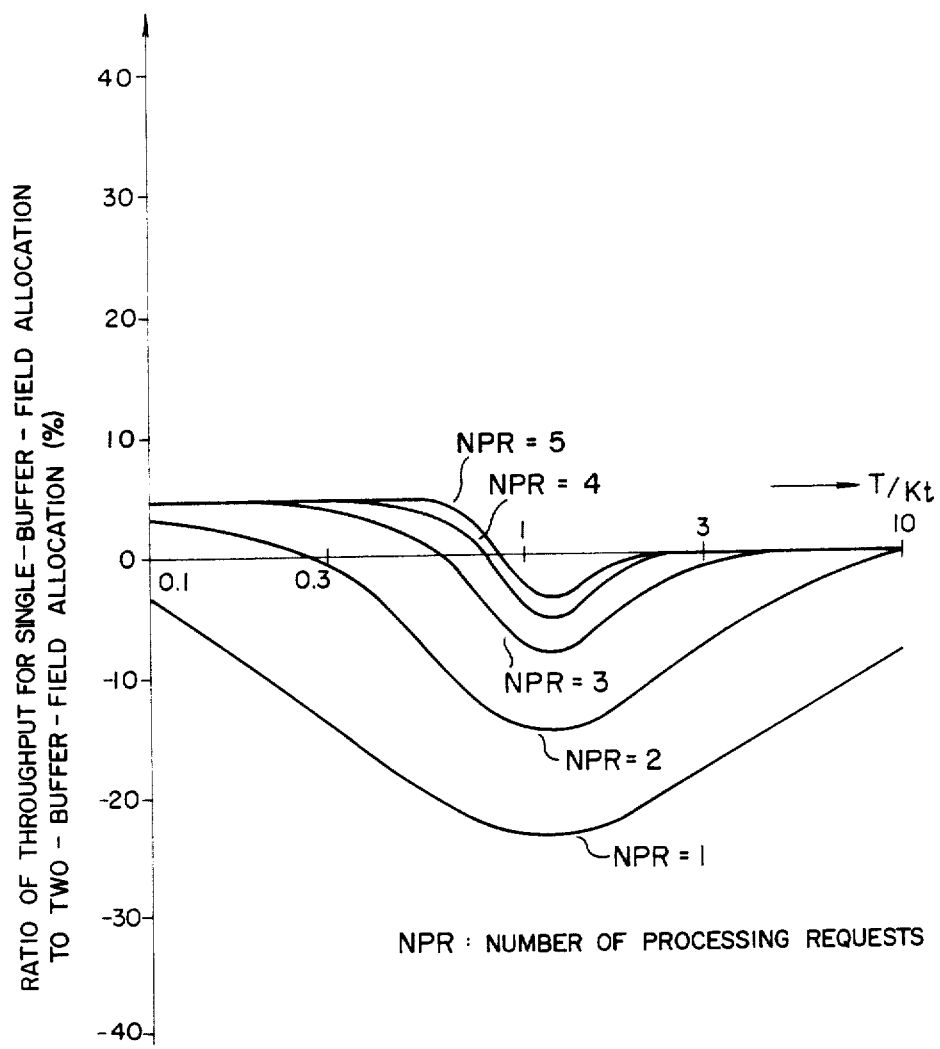
FIG. 3 is a view for illustrating graphically and comparatively the system throughputs for the cases where the number of buffer areas or fields allocated to each input/output device is selected equal to 1 and 2, respectively.
Figure 4:
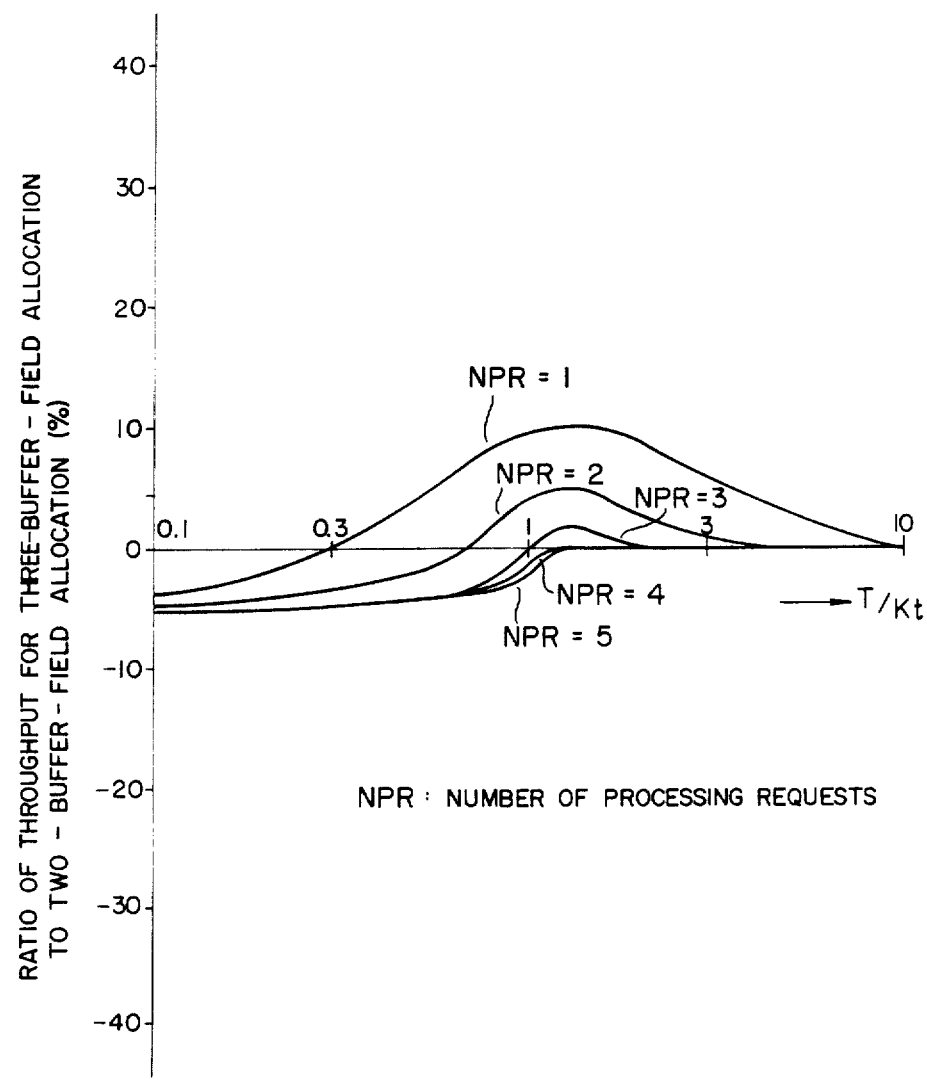
FIG. 4 is a view similar to FIG. 3 and shows comparatively the throughputs for the cases where the number of the buffer areas or fields is selected equal to 3 and 2, respectively.

FIGS. 3 and 4 graphically illustrate the results of evaluations in summarized forms, respectively. In both the figures, T/Kt is taken along the abscissa. Evaluation has been made for all regions including those where the processing of the data processor (b) 21 is bottlenecked, where the processing of that processor is balanced, and where other processings than that of the data processor (b) 21 are bottlenecked. The ordinates of FIGS. 3 and 4 represent the relative throughputs when the number of buffer areas allocated to each MT device is 1 and 3, respectively, the value of the relative throughput being plotted with reference to the throughput in the case where the number of the buffer areas allocated to each MT device is 2, namely, with the throughput in that case taken as 1 (one). Here the buffer capacity allocated to each MT device remains the same.

FIG. 3 shows comparatively the cases where the number of the buffer areas is 1 and 2, respectively, while FIG. 4 shows comparatively the cases where the number of the buffer areas is 2 and 3, respectively.

From the result illustrated in FIG. 3, it will be seen that the number of the buffer areas or fields selected equal to 2 can assure more excellent system performance unless the number of the active MT devices is more than 4.

On the other hand, the comparison of the cases where the number of the buffer areas or fields is 3 and 2, respectively, tells that a greater number of the buffer areas (i.e. three buffer areas) permits the better system performance when the number of active MT devices is 1 (one). However, when the number of the active MT devices is increased to two or more, the number of the buffer areas or fields equal to 2 can assure performance of same degree as the three buffer areas (when the number of the active MT devices is equal to 2) or improved performance as compared with the three buffer areas (when the number of the active MT devices is more than 2).

From the foregoing, it may be concluded that although the optimal number of the buffer areas m to be allocated to each of the MT devices is difficult to be definitely determined, two or three buffer areaa allocated to each MT device are suited for practical applications.

However, in consideration of the fact that the number of the active MT devices will actually vary dynamically, the buffer size (i.e. the number of the buffer areas) allocated to each MT device should be correspondingly changed. In light of this, examination will be made more concretely on the practical configurations of the control system.

The following description will be made of the control system on the assumption that m=2 (i.e. two buffer areas are allocated to each MT device), it being understood that the control system can be readily expanded for other partical values of m.

In the present invention, the buffer 14 is divided into a number of small areas or fields 70 each of which is used as the minimum unit to be allocated to each MT device, as shown in FIG. 7. In the case of the read processing, the preload processing of data of the amount corresponding to K/(2n) is initiated every time the amount of the preloaded data becomes less than K/(2n). On the other hand, in the case of the write processing, the after-write processing of the initially written data of K/(2n) is executed when the amount of data ($\Delta$d) written in the buffer 14 exceeds the capacity of K/(2n). When $\Delta$d exceeds K/n, the output processing of the corresponding processing request may be temporally interrupted.

FIG. 5 shows in detail a format of the MT buffer managing data unit 16.

The format shown in FIG. 5 is for the single MT device. In practice, there are prepared a number of the illustrated formats corresponding to the number of the MT devices connected to the control unit 13. In the format, data placed in an area MTID 50 identifies which of the MT devices 15 is associated with the format. Data in an area 51 labelled MT STATE indicates whether the associated MT device is in the non-active state, mount-requesting state, execution-state (run-state) or rewind-state. Data placed in the area 52 labelled READ/-WRITE STATE indicates whether the associated MT device is performing the read action (i.e. in the read state), the write action (write state) or no action (off-state). Area 53 labelled BUFFER ADDRESS contains the buffer address assigned to the associated MT device. Data placed in the area 54 labelled BUFFER LENGTH indicates the length of the buffer areas allocated to the associated MT device. A flag set at an area 55 indicates whether or not the associated MT device is to be subjected to the preload and the after-write operations or not. A flag 56 indicates completion of the preload and the after-write operation. A wait flag set at an area 57 indicates whether or not an access request to the associated MT device is in a wait state. Finally, a flag area 58 is reserved for flags used temporarily.

FIG. 6 shows in detail a format of the control data unit 17. Data placed in the area 60 labelled "NUMBER OF ACTIVE MTS" indicates the number of the active MT devices. Data in an area 61 indicates availability or capacity of the empty or blank areas in the buffer, and an area 62 labelled EMPTY BUFFER POINTER contains pointers to the blank or space areas of the buffer 62.

FIG. 7 is a view showing the details of the buffer unit 14. As will be seen in the figure, the buffer unit 14 is divided into a number of small areas 70 each having a predetermined length and referred to as the field. The blank or empty fields 70 and the fields 70 allocated to the same MT device and storing data are interconnected by pointers, respectively, as illustrated in FIG. 7. When the length of the record data of the MT device exceeds th capacity of the field 70, the record data is stored in a number of the fields 70. The buffer address 53 indicates the leading one of the fields 70 in which the data for the MT device identified by the data in the MTID area 50 (FIG. 5) is stored. The blank or empty buffer pointer 62 indicates the leading one of a string of the blank or empty fields.

Figure 8A:
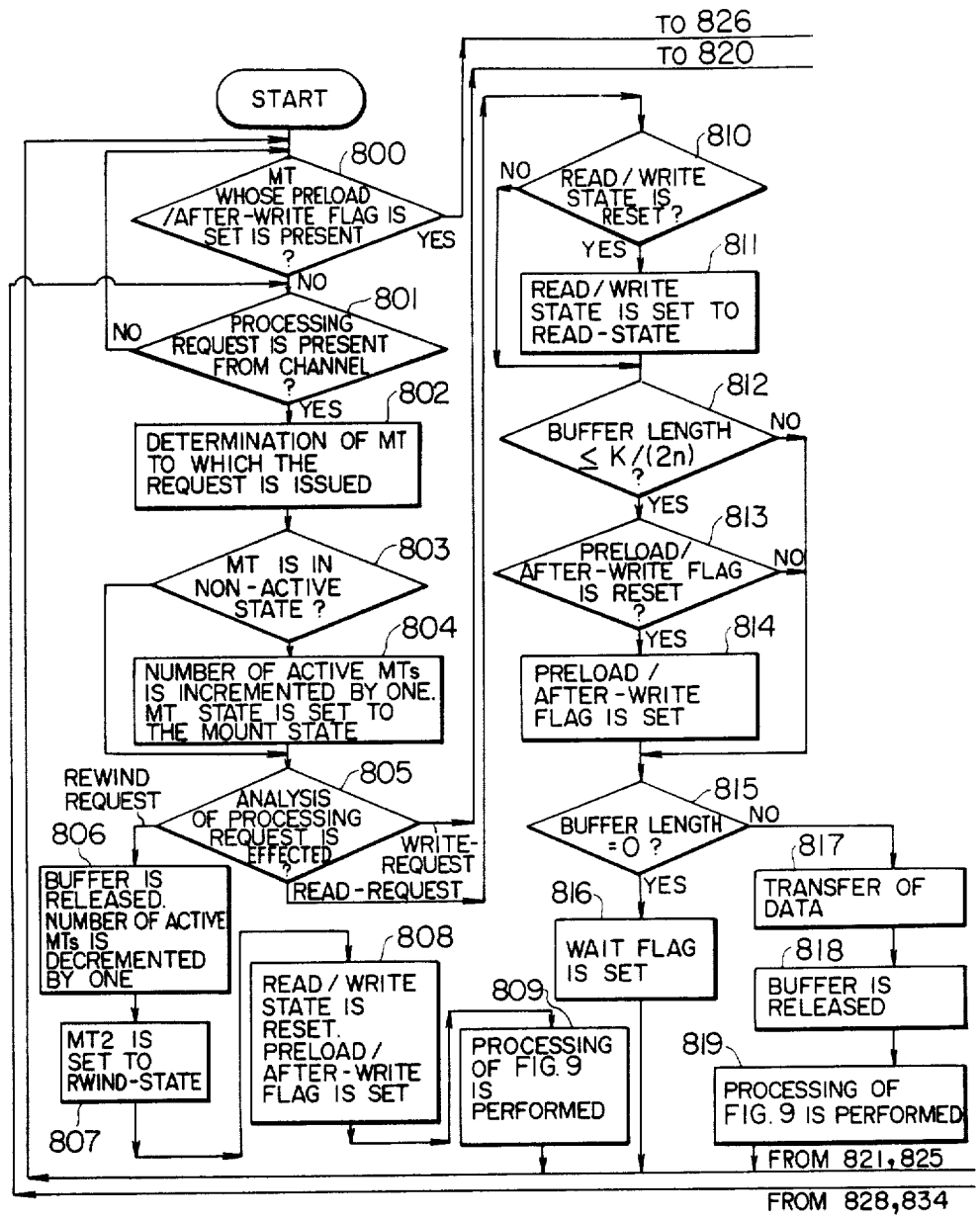
FIGS. 8a and 8b are views illustrating in a flow chart the processing executed by a processor (a) shown in FIG. 2.
Figure 8B:
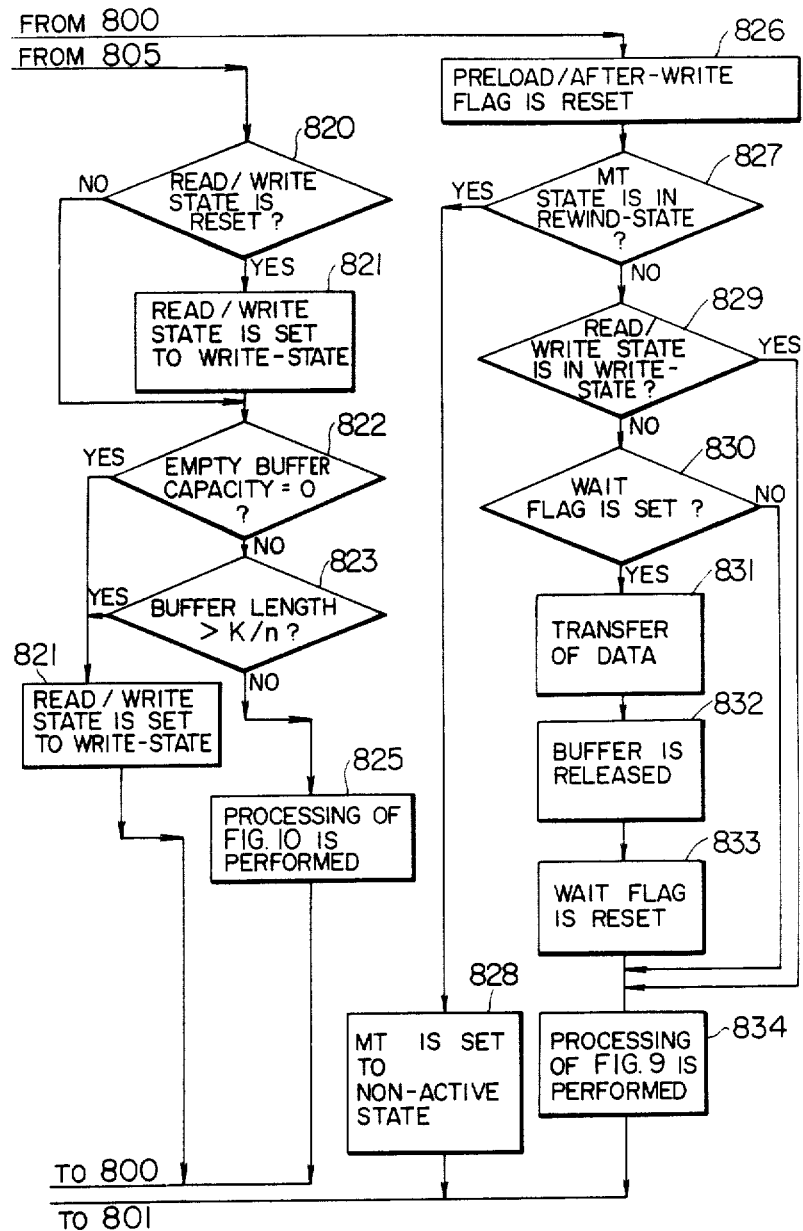

FIGS. 8a and 8b show in a flow chart a main routine of the processings executed by the processor (a) 20.

In the following, the processings performed by the processor (a) 20 will be described by referring to FIG. 8. The processor (a) 20 starts the processing, when the preload/after-write flag of a given MT device is set by the processor (b) 21 (step 800) or when the processor (a) 20 receives the processing request through the channel 12 (step 801). Upon reception of the processing request from the channel 12, the processor (a) 20 determines or identifies the MT device to which the processing request is issued (step 802) and checks the current state of the identified MT device on the basis of data placed in the MT state area 51 of the MT buffer managing data unit 16 (step 803). When the MT device in concern is found to be in the non-active state, the MT state area 51 is placed with the data for setting the mount-state, as the result of which the number of the active MT devices is incremented by 1 (one) (step 804).

Next, the content of the processing request being issued is analyzed (step 805).

When the processing request in concern is found to be a rewind-request, the buffer fields allocated to the identified MT device to which the request is associated are linked to the blank or empty buffer pointer 62 to thereby increase correspondingly the blank or empty buffer space or capacity 61 (FIG. 6) while decrementing the active MT device number 60 (FIG. 6) by one (step 806). Next, the MT state area 51 is set to the rewind state (step 807). Further, the read/write area 52 is cleared and the preload/afterwrite flag 55 is set (step 808). Subsequently, the processing illustrated in FIG. 9 is carried out (step 809). The reason for performing the processing shown in FIG. 9 is for executing the write processing request which is in the waiting state because of the absence of the blank or empty buffer field.

When the processing request is the read request, the read/write area 52 is set to the read state (step 811) if the area 52 is found cleared (step 810). Subsequently, when the buffer length 54 (FIG. 5) is found to be smaller than $K/(2n)$ (where K and n have the same definitions made hereinbefore) (step 812) and when the preload/afterwrite flag 55 is not set (step 813), the flag 55 is set (step 814). Additionally, it is determined if the buffer length (54) is zero or not (step 815). When the buffer length is found to be zero, the wait flag 57 is set and the connection with the channel 12 is removed once (step 816). Otherwise, the data transfer is performed (step 817) and the empty buffer fields are linked to the blank or empty buffer pointer 62 (FIG. 6), to thereby increase the empty buffer space or capacity correspondingly, while the buffer length 54 (FIG. 5) is decreased correspondingly (step 818). Subsequently, the processing shown in FIG. 9 is performed (step 819).

Figure 10:
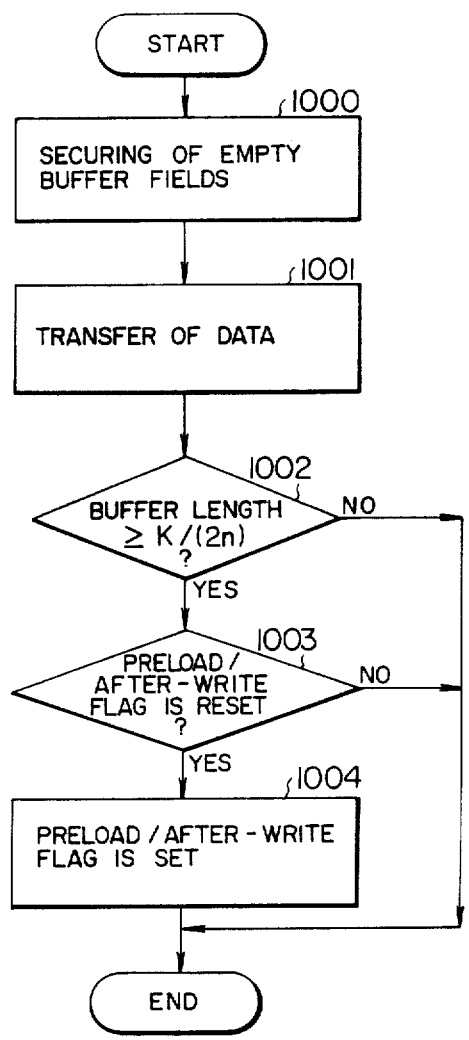
FIG. 10 is a view illustrating in a flow chart another sub-processing executed by the processor (a)

In case the processing request is the write-request, the read/write state 52 (FIG. 5) is set to the write state (step 821) when the area 52 is found empty (step 820). Next, it is examined whether the empty buffer space 61 is zero (step 822) or the buffer length 54 is more than $K/n$ (step 823). When the condition is met, the wait flag 57 is set, to thereby remove once the connection with the channel 12 (step 824). Otherwise, the processing shown in FIG. 10 is performed for transferring data to the buffer (step 825).

Next, operation taking place upon reception of the completion message from the processor (b) 21 will be described.

First, the preload/after-write completion flag 56 is reset (step 826). It is checked whether the MT state 51 is in the rewind-state or not (step 827). If so, the MT state 51 is reset to the non-active state, whereupon the completion message is issued to the channel 12 (step 828). Subsequently, it is checked whether the read/write state 52 is in the read-state or in the write-state (step 829). If it is in the write state, the processing shown in FIG. 9 is performed in order to allocate the empty buffer space resulting from the after-write operation to the processing request which is in the waiting state because of unavailability of the empty buffer space (step 834). If the checked state has proven to be the read-state, data transfer takes place (step 831) when the wait flag 57 is set (step 830). Subsequently, the buffer field from which data has been transferred is linked to the empty buffer pointer 62 to decrement the buffer length 54 and increment the empty buffer space or capacity 61 (step 832), which is followed by the resetting of the wait flag 57 (step 833). Next, the processing shown in FIG. 9 is executed.

More specifically, FIG. 9 shows in a flow chart a sub-processing to be performed by the processor (a) 20.

Now, description will be made by referring to the processing flow chart shown in FIG. 9.

At first, the temporary flags 58 of all the MT devices are set (step 900). Subsequently, a given one of the MT devices whose temporary flag 58 is set is extracted (step 901) to examine whether the empty buffer space or field is zero (step 902). If so, the processing is terminated. When the read/write state 52 of the extracted MT device has proven to be the write-state (step 903) and when the wait flag 57 is set (step 904), it is checked whether the buffer length 54 is less than $K/n$ (step 905). Only when this condition is met, the processing for resetting the wait flag 57 is performed (step 906), which is followed by the processing shown in FIG. 10 (step 907). Next, the temporary flag 58 is reset (step 908), being followed by the examination as to whether all the temporary flags 58 are reset (step 909). When this condition is met, the processing comes to an end. Otherwise, the processing for finding out the MT device whose temporary flag is set is regained (step 901).

Next, the sub-processing to be performed by the processor (a) 20 will be described by referring to the flow chart shown in FIG. 10.

First, the empty buffer field is secured, and the empty buffer space or capacity 62 is decremented while the buffer length 54 is correspondingly increased (step 1000). Next, the data transfer takes place (step 1001). Subsequently, when the buffer length 54 is found to be more than $K/(2n)$ (step 1002) and when the preload/afterwrite flag 55 is reset (step 1003), that flag 55 is set.

Figure 11:
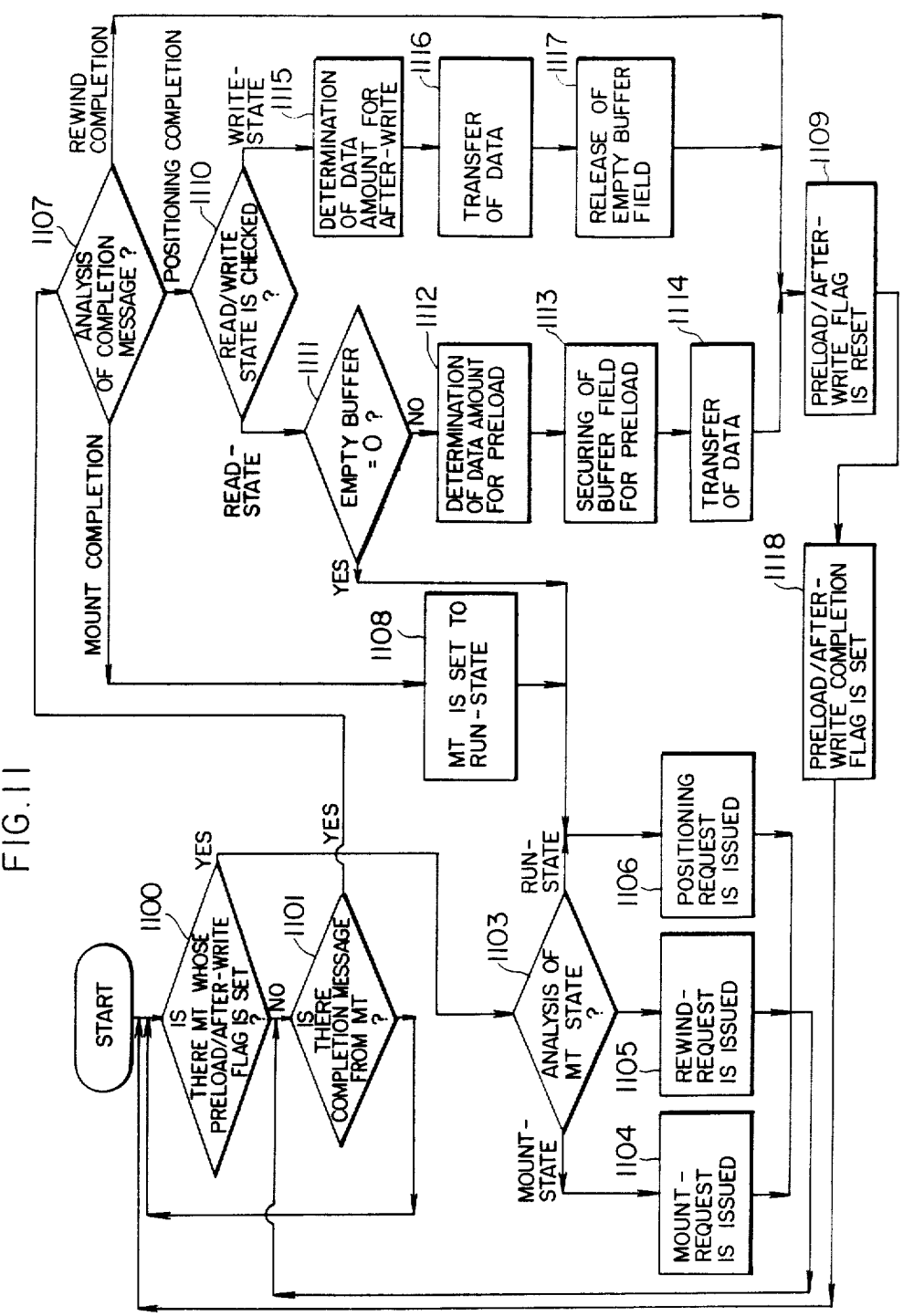
FIG. 11 is a view showing in a flow chart a sub-processing executed by a processor (b) shown in FIG. 2.

FIG. 11 is a flow chart for illustrating the processing to be performed by the processor (b) 21.

The processor (b) 21 can initiate the processing when the preload/after-write flag 55 for a given one of the MT devices is set by the processor (a) 20 (step 1100) or when the start action completion message from one of the MT devices 15 is received by the processor (b) 21 (step 1101). When the preload/after-write flag 55 is set (step 1100), the state of the MT device is analyzed on the basis of data of the MT state area 51 (step 1103). If the MT device is found in the mount-state, a mount-request is issued to the designated one of the MT devices 15 (step 1104). In the rewind-state, a rewind-request is issued. In the run state (the state ready for execution) a start-action request is issued (step 1106).

Upon reception of the completion message from one of the MT devices 15 (step 1101), the content of the completion message is examined (step 1107). When the content indicates the completion of the mount processing, data indicative of the run-state is placed in the MT state area 51 (step 1108), whereupon a jump is made to a step 1106. When the content in concern informs the completion of the rewind-processing, the preload/after-write flag 55 is reset (step 1109), which is followed by the setting of the preload/after-write flag 55 (step 1118), whereupon the processing comes to an end. When the content informs completion of the start action, the read/write state data 52 is checked (step 1110).

In the read-state, it is checked whether the empty buffer space or capacity 61 is zero or not (step 1111). If zero, a jump is made to the step 1106. Otherwise, the amount of the preload data is set to a smaller value of the currently available empty buffer capacity 61 and K/(2n) (step 1112). Next, the buffer space of the corresponding capacity is secured, while value of the empty buffer space data 61 is correspondingly decreased with the value of the buffer length data 54 being correspondingly increased (step 1113). Further, the preload of data of the corresponding amount is executed (step 1114). Subsequently, a jump is made to the step 1109.

In the case of the write state, the amount of data for the after-write operation is set at a smaller value of the buffer length 54 and K/(2n) (step 1115). Subsequently, the after-write operation of data of the corresponding amount is performed. Further, the buffer fields which become empty are linked to the buffer pointer 62, while value of the buffer length 54 is correspondingly decreased with the value of the empty buffer space or capacity 61 being increased correspondingly (step 1117). Subsequently, jump is made to the step 1109.

From the expression (2) mentioned hereinabove, it will be seen that in the case of the MT devices without the vacuum column, the amount or quantity of data for the preload and/or the after-write operation must be controlled in dependence on the number of the active MT devices. However, since the number of the active MT devices changes dynamically, the control must be performed so as to follow the changes. According to the illustrated embodiment of the invention, the number of the active MT devices is checked every time the input/output request is received through the channel, to thereby determine the amount of data for the preload or the after-write operation definitely as a function of the number of the active MT devices.

As will be apparent from the foregoing description, the amount of unit or block data for the preload and/or the after-write operation in the input/output device (the MT device in the case of the illustrated embodiment) can be determined optimally in dependence on the number of the active input output devices.

We claim:

1. An input/output control system having control means connected to a plurality of input/output devices, a channel and a data buffer for storing data for said plurality of input/output devices, said control means comprising:

a first controller connected between said data buffer and said channel for controlling data transfer between said data buffer and said channel and a second controller connected between said data buffer and said input/output devices for controlling data transfer involving a preload or after-write operation between said data buffer and said input/output devices, start actions of each of said input/output devices being performed offline from said control means, and the data transfer between said data buffer and said input/output devices being performed after the start actions have been completed;

means for determining the amount of data stored in said data buffer each time a request for data transfer occurs between said channel and said data buffer; and transfer means for transferring an amount of data for preload equal to a first predetermined value from said input/output devices to said data buffer in the case of a read processing when the amount of data in said data buffer is determined to be less than said first predetermined value and for transferring an amount of data for after-write equal to a second predetermined value from said data buffer to said input/output devices in the case of a write processing when the amount of data in said data buffer is determined to exceed said second predetermined value, each of said first and second predetermined values being determined by allocating the buffer space in accordance with the number of input/output devices which are in an active state at that time where the number of active input/output devices varies dynamically, whereby the amount of data stored in said data buffer for each of the plurality of active input/output devices is dynamically determined based on the number of active input/output devices each time a data transfer occurs between said channel and data buffer.

2. An input/output control system according to claim 1, wherein said input/output devices are constituted by magnetic tape devices, and said active input/output devices correspond to magnetic tapes mounted on said magnetic tape devices.

3. An input/output control system according to claim 1, wherein each of said active input/output devices is allocated with m ($\geq 2$) unit fields of said data buffer each having a capacity of approximately K/(mn) where K represents the whole capacity of said data buffer and n represents the number of said active input/output devices.

4. An input/output control system according to claim 3, wherein upon reception of a load request to a given one of said input/output devices from said channel, said transfer means preloads the succeeding data of the amount of approximately K/(mn) into said data buffer from said given input/output device when the amount of data in said data buffer is determined to be less than said first predetermined value.

5. An input/output control system according to claim 2, wherein said second predetermined value is approximately K/(mn), and upon reception of an output request issued to a given one of said input/output devices from said channel, said transfer means performs the after-write operation of data of the amount of approximately K/(mn) into said given input-output device from said dtat buffer when the amount of data in said data buffer is determined to exceed the amount of approximately K/(mn).

6. An input/output control system according to claim 5, wherein the writing of data from said channel into said data buffer is temporarily interrupted when the amount of data in said data buffer is determined to exceed the amount of approximately K/n.

* * * * *